(12) United States Patent
Sato

(10) Patent No.: US 10,199,966 B2
(45) Date of Patent: Feb. 5, 2019

(54) BRUSHLESS MOTOR DRIVE DEVICE

(71) Applicant: Panasonic Intellectual Property Management Co., Ltd., Osaka (JP)

(72) Inventor: Daisuke Sato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/310,721

(22) PCT Filed: Mar. 5, 2015

(86) PCT No.: PCT/JP2015/001178
§ 371 (c)(1),
(2) Date: Nov. 11, 2016

(87) PCT Pub. No.: WO2015/182020
PCT Pub. Date: Dec. 3, 2015

(65) Prior Publication Data
US 2017/0077852 A1 Mar. 16, 2017

(30) Foreign Application Priority Data
May 28, 2014 (JP) .................. 2014-109795

(51) Int. Cl.
*H02P 23/00* (2016.01)
*H02P 21/22* (2016.01)
(Continued)

(52) U.S. Cl.
CPC .............. *H02P 6/28* (2016.02); *G05B 19/409* (2013.01); *G06F 1/04* (2013.01); *G06F 11/1604* (2013.01);
(Continued)

(58) Field of Classification Search
CPC ........ H02P 23/00; H02P 21/22; G05B 19/409
(Continued)

(56) References Cited

U.S. PATENT DOCUMENTS 5,694,014 A * 12/1997 Hegg ................... G05B 19/409
244/223
5,990,656 A * 11/1999 Kardash ................... H02P 6/08
318/437

(Continued)

FOREIGN PATENT DOCUMENTS

CN 101399513 A 4/2009
JP 08-036447 A 3/1996
(Continued)

OTHER PUBLICATIONS

English Translation of Chinese Search Report dated Jul. 5, 2017 for the related Chinese Patent Application No. 201580027713.X.
(Continued)

*Primary Examiner* — Eduardo Colon Santana
*Assistant Examiner* — Cortez M Cook
(74) *Attorney, Agent, or Firm* — McDermott Will & Emery LLP

(57) ABSTRACT

A brushless motor drive device includes the following: an inverter circuit configured to energize and drive the winding of a brushless motor; a current detection circuit configured to detect the current value of the winding; a control unit configured to control the rotation of the motor; and an RC filter including a resistor and a capacitor. The control unit includes the following: a drive control unit configured to generate a signal to drive the inverter; a clock generation circuit configured to generate a clock pulse to be used as a reference for an operation period; a pulse output circuit configured to generate a pulse signal with a changing frequency based on the clock pulse and to apply the pulse signal to the RC filter; an AD converter circuit connected to the capacitor of the RC filter and the current detection circuit; and an AD-conversion-error calculation unit configured to calculate the conversion error of the AD converter circuit. The AD-conversion-error calculation unit calculates the conversion error based on the difference between the output value of the AD converter circuit produced in
(Continued)

response to an input of the voltage of the capacitor and an AD-converted value calculated from the charging time of the capacitor.

10 Claims, 5 Drawing Sheets

(51) Int. Cl.
  *G05B 19/409* (2006.01)
  *H02P 6/28* (2016.01)
  *G06F 1/04* (2006.01)
  *H02P 29/04* (2006.01)
  *H02P 6/18* (2016.01)
  *G06F 11/16* (2006.01)

(52) U.S. Cl.
  CPC ............... *H02P 6/18* (2013.01); *H02P 21/22* (2016.02); *H02P 23/00* (2013.01); *H02P 29/04* (2013.01)

(58) Field of Classification Search
  USPC ........................................................ 318/490
  See application file for complete search history.

(56) References Cited

U.S. PATENT DOCUMENTS

| | | | | |
|---|---|---|---|---|
| 2004/0257029 A1* | 12/2004 | Sakamoto | ............ | G01R 31/343 318/802 |
| 2007/0252744 A1* | 11/2007 | Takeuchi | ............ | H03M 1/1076 341/155 |
| 2009/0085508 A1* | 4/2009 | Nagai | ................... | H02P 21/22 318/605 |
| 2010/0026405 A1* | 2/2010 | Ueno | ................... | H03L 7/0893 331/36 C |
| 2013/0063069 A1* | 3/2013 | Ko | ........................ | H02P 6/085 318/722 |
| 2013/0278197 A1* | 10/2013 | Sasaki | ................... | H02P 23/00 318/490 |
| 2014/0001999 A1 | 1/2014 | Sato | | |

FOREIGN PATENT DOCUMENTS

| | | |
|---|---|---|
| JP | 8-230651 | 9/1996 |
| JP | 2000-269812 A | 9/2000 |
| JP | 2004-343878 A | 12/2004 |
| JP | 2005-218275 A | 8/2005 |
| JP | 2013-046488 | 3/2013 |
| WO | 2012/066800 A1 | 5/2012 |

OTHER PUBLICATIONS

The Extended European Search Report dated Apr. 25, 2017 for the related European Patent Application No. 15800076.0.
International Search Report of PCT application No. PCT/JP2015/001178 dated May 26, 2015.

* cited by examiner

BRUSHLESS MOTOR DRIVE DEVICE

TECHNICAL FIELD

The present invention relates to a brushless motor drive device for driving a brushless motor. The invention particularly relates to a brushless motor drive device having the function of diagnosing faults in AD (analog-digital) converter circuits and current detection circuits and then generating correction values. The diagnosis is made before variations in motor control circuits cause a difference between a commanded torque and an actual torque, which may be caused by the above-mentioned faults.

BACKGROUND ART

Cooling fans typically used in refrigerators include a brushless motor because of its features of long life and energy saving. The fans are controlled to follow their air volume and driving noise depending on the ambient temperature and the temperature of an object to be cooled. It is known that variations in the air volume depend on variations in the rotation speed of the motor attached to the impeller, whereas the driving noise depends on the rotation torque of the motor.

Sensorless three-phase brushless motors driven by pulse width modulation (hereinafter, PWM) have been controlled by, for example, the following brushless motor drive device. In this motor drive device, the rotational position of the motor is estimated from the values of the currents flowing through the three-phase coils, and the actual rotation speed is calculated from the amount of change in the rotational position per unit time. The calculated actual rotation speed is then used to control the switching pulse width of MOS-FET devices in the inverter circuit performing PWM operation.

Assume here that there is an error in any of the following circuits: current detection circuits for detecting the current values of the coils, AD converter circuits for inputting the outputs of the current detection circuits into a microcomputer, and a clock generation circuit for generating a unit time pulse. In this case, a similar error may occur in the actual rotation speed and torque that are to be calculated and cause a deviation from a target value.

A previously proposed approach is to diagnose faults in a clock generation circuit and an AD converter circuits by applying a pulse voltage with a predetermined time interval generated based on a clock pulse to an RC filter and determining whether the voltage for diagnosis at a predetermined clock cycle number falls outside a predetermined range (see, for example, PTL 1).

Another previously proposed approach is to correct the rotation speed by calculating the error rate of a reference clock to operate a microcomputer based on the cycle of a PWM signal (command signal) received from a host unit (see, for example, PTL 2).

However, in PTL 1, when the voltage for diagnosis is within the predetermined range, an error in the AD converter circuit makes it impossible to accurately calculate the current value detected by the current detection circuit and causes a torque error. Meanwhile, in PTL 2, the error rate of the reference clock can be used to correct the rotation speed, but it is impossible to detect an error in the AD converter circuit.

CITATION LIST

Patent Literature

PTL 1: Japanese Unexamined Patent Application Publication No. H08-230651
PTL 2: Japanese Unexamined Patent Application Publication No. 2013-046488

SUMMARY OF THE INVENTION

The present invention is directed to provide a brushless motor drive device including the following: an inverter circuit that energizes and drives the winding of the brushless motor; a current detection circuit that detects the current value of the winding; a control unit that controls the rotation of the brushless motor; and an RC filter including a resistor and a capacitor. The control unit includes the following: a drive control unit that generates a signal to drive the inverter; a clock generation circuit that generates a clock pulse to be used as a reference for an operation period; a pulse output circuit that generates a pulse signal with a changing frequency based on the clock pulse and to apply the pulse signal to the RC filter; an AD converter circuit connected to the capacitor of the RC filter and the current detection circuit; and an AD-conversion-error calculation unit that calculates the conversion error of the AD converter circuit. The AD-conversion-error calculation unit calculates the conversion error based on the difference between the output value of the AD converter circuit produced in response to the input of a voltage of the capacitor and the AD (analog-digital)-converted value calculated from the charging time of the capacitor.

In the brushless motor drive device in accordance with the present invention, the conversion error of the AD converter circuit can be calculated and used either to diagnose faults in the AD converter circuit or to correct an output value of the AD converter circuit and then to input the value into software with high precision. This allows high-precision calculation of the current value detected by the current detection circuit so as to reduce rotation errors and torque errors, thereby reducing variations in the air volume and driving noise of the cooling fan.

It is known that typical AD converter circuits have a lower effective number of bits and lower conversion characteristics as their input analog signals have a higher frequency. To deal with such characteristics of the AD converter circuits, the brushless motor drive device in accordance with the present invention calculates the conversion error of the AD converter circuit by using a pulse signal with a changing frequency. More specifically, unlike the static method of applying a DC voltage to the input of the AD converter circuit and calculating the conversion error while changing the voltage, the motor drive device in accordance with the present invention can calculate the conversion error based on the realistic conversion characteristics by using the pulse signal with the changing frequency. Thus, the device in accordance with the present invention can diagnose faults in the AD converter circuit and correct the output value of the circuit with high precision by simply applying a pulse signal to the RC filter.

As described above, the brushless motor drive device in accordance with the present invention does not require a large motor or a large circuit board to ensure enough margin for the rotation error or the torque error, so that the cooling fan can be smaller and lighter in weight.

DESCRIPTION OF EMBODIMENTS

Exemplary embodiments of the present invention will now be described with reference to drawings.

First Exemplary Embodiment

Figure 1:
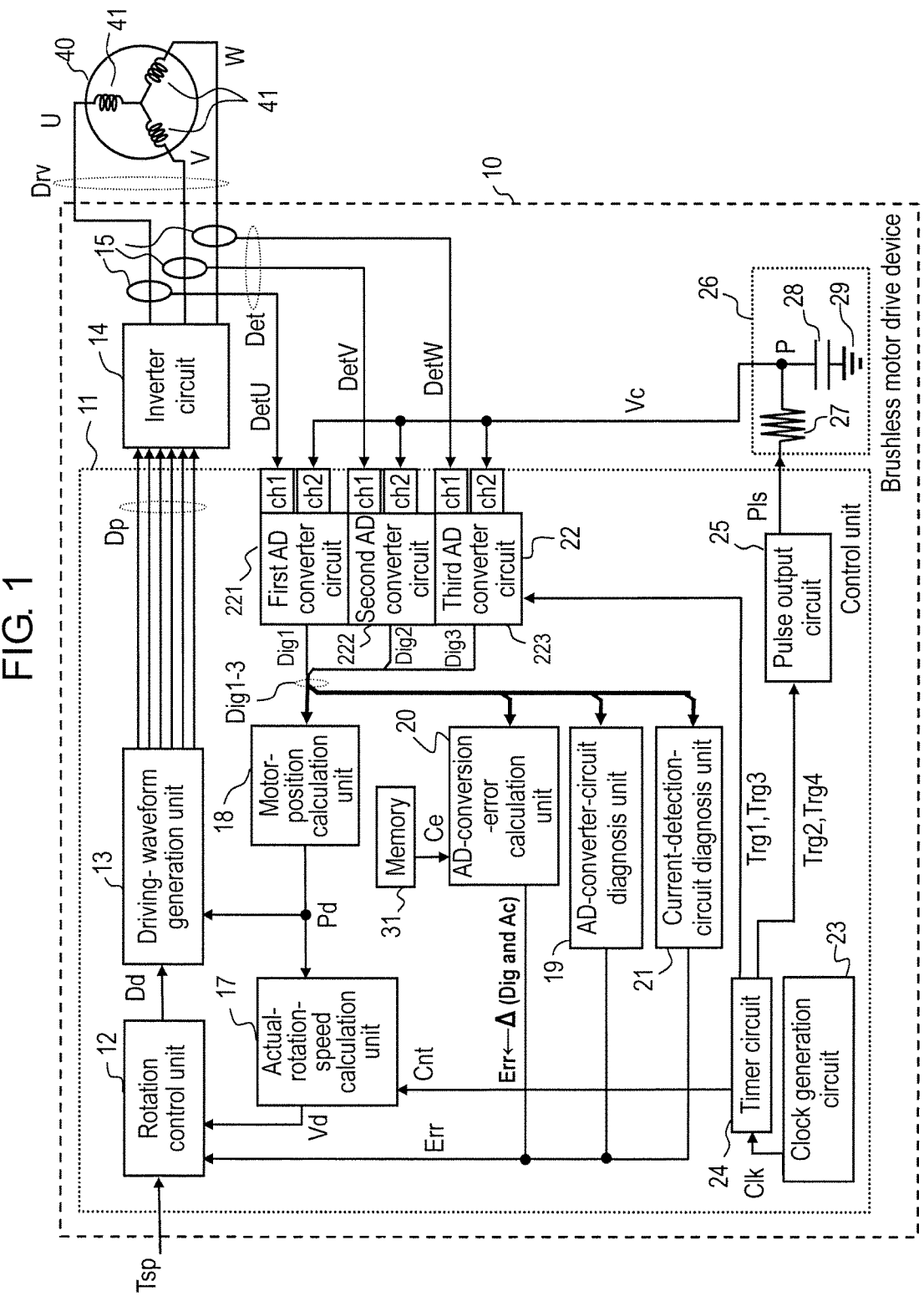
FIG. 1 is a block diagram showing a configuration of a brushless motor drive device in accordance with a first exemplary embodiment of the present invention.

FIG. 1 is a block diagram showing a configuration of brushless motor drive device 10 in accordance with a first exemplary embodiment of the present invention. In the example of FIG. 1, brushless motor drive device 10 is connected to brushless motor 40. Device 10 drives motor 40 to control its rotation in accordance with an external command.

Motor 40 includes a stator with coils 41 whose windings are wound around the stator core, and a rotor configured to rotate around the shaft when coils 41 are energized and driven. The present exemplary embodiment describes a case in which motor 40 includes coils 41 of three phases U, V, and W, and device 10 rotates these phases using pulse-width modulated (PWM) drive signals Dry.

As shown in FIG. 1, device 10 includes current detection circuits 15, inverter circuit 14, control unit 11, and RC filter 26.

Device 10 receives as one of the commands from an external host controller (not shown) a rotation speed/torque command Tsp, which is a signal to control the rotation speed or the amount of torque. Device 10 generates the drive signals Dry to make motor 40 have the speed and torque corresponding to the rotation speed/torque command Tsp. Device 10 then applies the generated drive signals Dry to coils 41 so as to control the rotation of motor 40.

To make device 10 operate as above, control unit 11 generates PWM original signals Dp, which cause inverter circuit 14 to be switch-driven based on the residual between the rotation speed/torque command Tsp and the actual rotation speed under the proportional, integral, and differential (PID) control. Inverter circuit 14 generates the drive signals Dry to energize and drive coils 41 by switching internal switching elements connected to a power supply in accordance with the PWM original signals Dp and outputs the generated drive signals Dry.

In the present exemplary embodiment, device 10 for driving motor 40 is sensorless (not including a position sensor or other sensors), and instead, current detection circuits 15 are provided to detect the position of the rotor.

Current detection circuits 15, which are disposed adjacent to the wires for the three-phase drive signals Drv, detect the current values of these phases (U, V, and W) flowing through coils 41 wound around the stator core of motor 40. Circuits 15 then supply control unit 11 with analog voltages Det corresponding to the detected current values. Although details will be described later, control unit 11 includes AD (analog-digital) converter circuits, which convert the voltages Det into digital data and calculate the rotational position and speed of the rotor using the digital data.

The present exemplary embodiment further includes the function of diagnosing faults in current detection circuits 15, the AD converter circuits, and other units. More specifically, for the purpose of the fault diagnosis, device 10 in the present exemplary embodiment includes RC filter 26 including a resistor (R) and a capacitor (C).

Each unit of brushless motor drive device 10 will now be described in detail as follow.

Control unit 11, which drives motor 40 and controls its rotation, includes the following components: rotation control unit 12, driving-waveform generation unit 13, first, second, and third AD converter circuits 221, 222, and 223 (hereinafter, sometimes collectively referred to as AD converter circuits 22), motor-position calculation unit 18, and actual-rotation-speed calculation unit 17. These components compose a drive control unit that generates the original PWM signals Dp to drive inverter circuit 14 and supplies the generated signals Dp to inverter circuit 14.

Control unit 11 further includes clock generation circuit 23, which generates a clock pulse Clk as a clock signal for digital processing, and timer circuit 24, which generates various timing signals based on the clock pulse Clk.

In order to perform fault diagnosis for AD converter circuits 22 and current detection circuits 15, control unit 11 further includes pulse output circuit 25, AD-converter-circuit diagnosis unit 19, AD-conversion-error calculation unit 20, and current-detection-circuit diagnosis unit 21.

In control unit 11 configured as above, AD converter circuits 22 convert analog voltages entered to their channels ch1 and ch2 into digital signals Dig1, Dig2, and Dig3 and output them. Channels ch1 receive the voltages Det corresponding to the current values detected by current detection circuits 15. More specifically, first AD converter circuit 221 receives, through channel ch1, a voltage DetU corresponding to the U-phase current value and outputs the digital signal Dig1 corresponding to the voltage DetU. Second AD converter circuit 222 receives, through channel ch1, a voltage DetV corresponding to the V-phase current value and outputs the digital signal Dig2 corresponding to the voltage DetV. Third AD converter circuit 223 receives, through channel ch1, a voltage DetW corresponding to the W-shape current value and outputs the digital signal Dig3 corresponding to the voltage DetW. Although details will be described later, channels ch2 of AD converter circuits 22 receive a capacitor voltage Vc for fault diagnosis from RC filter 26.

The digital signals Dig1 to Dig3 from AD converter circuits 22 are supplied to motor-position calculation unit 18. Unit 18 calculates the rotor position of motor 40 from the signals Dig1 to Dig3 representing the three-phase current values. Thus, in the present exemplary embodiment, motor-position calculation unit 18 detects the rotational position of the rotor based on the detected current values of the three-phases. Unit 18 sends a rotor position signal Pd representing the calculated rotor position to both actual-rotation-speed calculation unit 17 and driving-waveform generation unit 13.

Actual-rotation-speed calculation unit 17 receives a timer count Cnt representing a predetermined time width from timer circuit 24 in addition to the rotor position signal Pd. Unit 17 calculates the actual rotation speed from the amount of change in the rotor position within the predetermined time width using the timer count Cnt and the rotor position signal Pd. Unit 17 then sends an actual rotation speed signal Vd representing the actual rotation speed to rotation control unit 12.

Rotation control unit 12 performs arithmetic processing such as proportion, integration, and differentiation (PID processing) on a deviation, which is the difference between the rotation speed/torque command Tsp and the actual rotation speed signal Vd. Unit 12 then generates a driving-waveform duty signal Dd corresponding to the results of the arithmetic processing and outputs the signal Dd. Driving-waveform generation unit 13 generates the PWM original signals Dp, which control the switching elements of inverter circuit 14, from the driving-waveform duty signal Dd and the rotor position signal Pd and then sends the generated signals Dp to inverter circuit 14.

Thus, in the present exemplary embodiment, the actual rotation speed signal Vd representing the actual rotation speed of the rotor is generated based on the current values detected by current detection circuits 15, whereas the rotation speed/torque command Tsp representing the commanded speed to control the rotation speed is received. Brushless motor drive device 10 forms a speed-control loop to perform feedback control by which the rotation speed of the rotor follows the commanded speed, based on the actual rotation speed signal Vd and the rotation speed/torque command Tsp. Device 10 controls the rotation of motor 40 by continuously executing the above-described loop.

For the purpose of executing the loop by digital processing or generating sampling timings of AD converter circuits 22, control unit 11 includes clock generation circuit 23 and timer circuit 24. Clock generation circuit 23 generates the periodic clock pulse Clk, which is used as a reference for the operation period, and distributes it as the reference clock of control unit 11 to each of the digital processing circuits and other components. Timer circuit 24, which operates with the reference clock pulse Clk, sends trigger signals Trg1 and Trg3 as sampling signals to AD converter circuits 22 at a predetermined timing. Timer circuit 24 further sends trigger signals Trg2 and Trg4 to pulse output circuit 25.

Timer circuit 24 may include a counter for counting the clock pulse Clk. In this case, timer circuit 24 outputs pulse signals representing the timings corresponding to the count numbers predetermined by the counter in the form of the trigger signals Trg1 to Trg4 or the timer count Cnt.

In a specific example, the clock pulse Clk has a period of 0.1 μS (10 MHz in terms of frequency). In timer circuit 24, assume that a pulse has a count number of 200 corresponding to the high period and a count number of 800 corresponding to the low period. In this case, timer circuit 24 outputs a 10 KHz periodic pulse signal with a high period of 20 μS and a low period of 80 μS. AD converter circuits 22 use the timing at which the pulse signal rises from low to high or falls from high to low as the sampling timing. Assuming that the rise of the 10 KHz pulse signal is used as the sampling timing of AD converter circuits 22, circuits 22 output digital signals Dig per 100 μS. In the following description, as known in the field of digital processing, the pulse signal has high and low levels, and the high level substantially corresponds to the voltage of a positive power supply Vcc, whereas the low level substantially corresponds to the voltage of the ground, which is the negative power supply.

The following is a detailed description of how to diagnose faults in AD converter circuits 22 and current detection circuits 15.

For the purpose of fault diagnosis, RC filter 26 in device 10 includes resistor 27 and capacitor 28 connected in series. One end of resistor 27 is connected to pulse output circuit 25, which outputs the pulse signal P1s for fault diagnosis. One end of capacitor 28 is connected to ground 29. An intermediate connection point P between resistor 27 and capacitor 28, which has the capacitor voltage Vc for fault diagnosis, is connected to channels ch2 of first to third AD converter circuits 22.

Each of AD converter circuits 22 reads the capacitor voltage (the voltage at the intermediate connection point P) Vc in RC filter 26 at the timing indicated by the trigger signals Trg1 and Trg3. Although details will be described later, each trigger signal Trg1 represents the timing at which the capacitor voltage Vc is at its lowest value as a result that capacitor 28 is fully discharged (hereinafter referred to as timing C1). Each trigger signal Trg3 represents the timing at which the capacitor voltage Vc is at its highest value in the measurement period as a result that capacitor 28 is fully charged (hereinafter referred to as timing C2). After the capacitor voltage Vc is completely read, timer circuit 24 sends the trigger signals Trg2 and Trg4 to pulse output circuit 25.

As described above, in the present exemplary embodiment, AD converter circuits 22 read the capacitor voltage Vc at its minimum at the timing of each trigger signal Trg1, and capacitor 28 starts to be charged at the timing of each trigger signal Trg2, which is immediately after the timing of each trigger signal Trg1. AD converter circuits 22 also read the capacitor voltage Vc at its maximum in the measurement period at the timing of each trigger signal Trg3, and capacitor 28 starts to be discharged at the timing of each trigger signal Trg4, which is immediately after the timing of each trigger signal Trg3.

To perform these charge and discharge operations, pulse output circuit 25 generates the pulse signal P1s with a predetermined duty ratio and period by switching the output level of the pulse signal P1s according to the received trigger signal Trg2 or Trg4 and sends the generated signal to RC filter 26. A feature of the present exemplary embodiment is that the pulse signal P1s to be supplied to RC filter 26 has a constant duty ratio and a gradually decreasing frequency in each measurement period in which the capacitor voltage Vc is read.

Units 19, 20, and 21 diagnose faults in AD converter circuits 22 and current detection circuits 15 using the capacitor voltage Vc measured at the above-described timings of the trigger signals Trg1 and Trg3. If any of the circuits 22 and 15 is diagnosed as faulty, an error stop signal Err is sent to rotation control unit 12 to stop the rotation of motor 40.

Although details will be described later, AD-conversion-error calculation unit 20 calculates a capacitor charging time Tc using the clock error rate Ce stored in memory 31.

Figure 2:
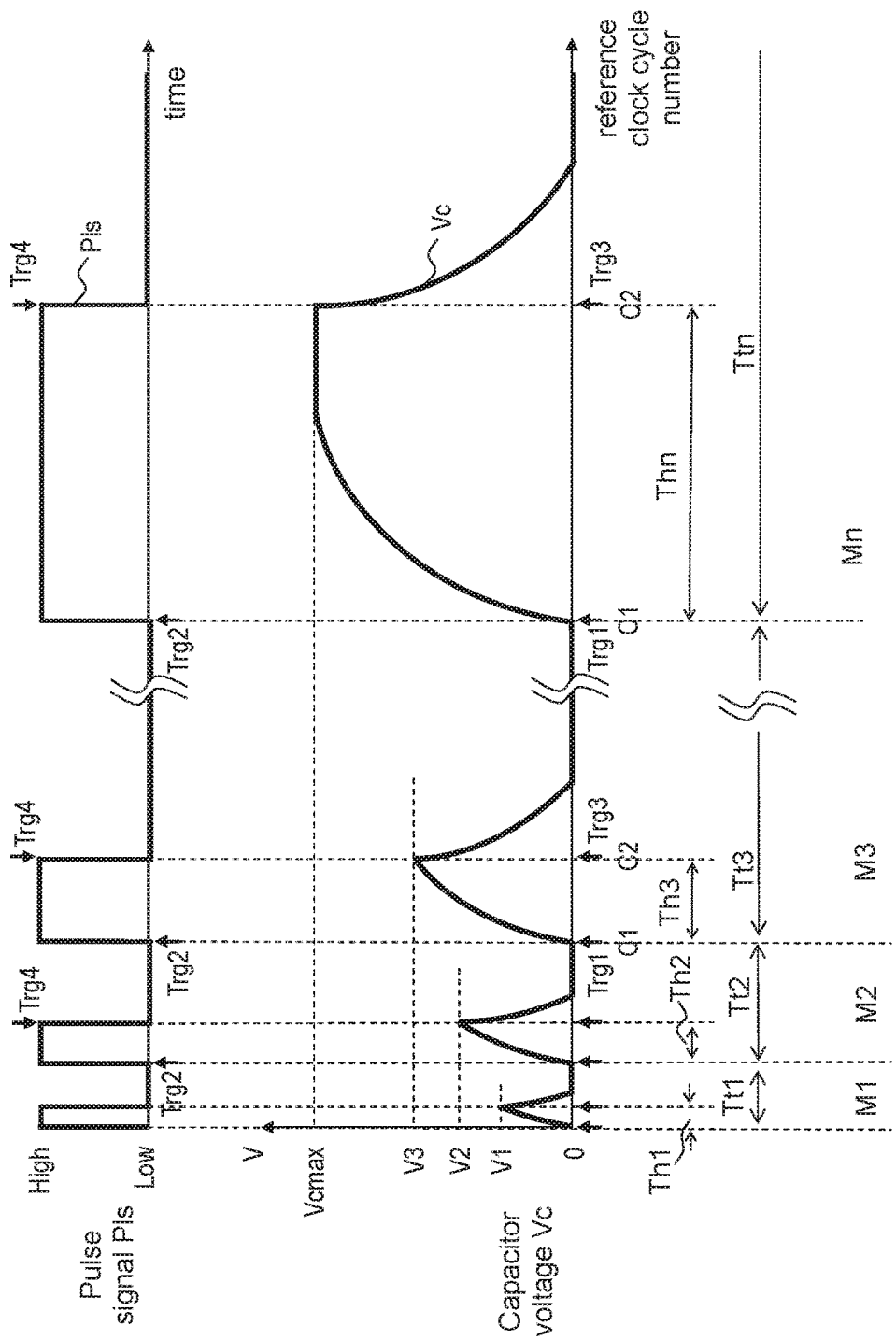
FIG. 2 shows the waveforms of a pulse signal Pls and a capacitor voltage Vc in the brushless motor drive device in accordance with the first exemplary embodiment.

FIG. 2 shows the waveform (upper part) of the pulse signal P1s to be applied to RC filter 26 from pulse output circuit 25, the waveform (lower part) of the capacitor voltage Vc, and the timings at which AD converter circuits 22 read voltages in brushless motor drive device 10.

In the example of FIG. 2, the measurement periods for fault diagnosis include a first measurement period M1, a second measurement period M2, a third measurement period M3, and an nth measurement period Mn. The time width of each cyclic period Tt includes periodic time widths Tt1 to Ttn corresponding, respectively, to the measurement periods M1 to Mn. The pulse signal P1s has high periods Th having high period widths Th1 to Thn in the respective measurement periods. For example, in the first measurement period M1, the period Th in which the pulse signal P1s is high within the periodic time width Tt1 has the high period width Th1.

As described above, the pulse signal P1s supplied from pulse output circuit 25 in the present exemplary embodiment has the predetermined duty ratio and the decreasing frequency. More specifically, in the present exemplary embodiment, a duty ratio defined as the time width of a high period Th to the time width of the corresponding cyclic period Tt is to be constant (i.e. Th1/Tt1=Th2/Tt2=Th3/Tt3=Thn/Ttn) in the measurement periods M1 to Mn of the pulse signal P1s. As apparent from FIG. 2, in the measurement periods M1 to Mn of the pulse signal P1s, the time width in one cyclic period Tt increases (decreases in terms of frequency) as is expressed by Tt1<Tt2<Tt3<Ttn.

In order to generate the pulse signal P1s, pulse output circuit 25 receives the trigger signals Trg2 and Trg4 from timer circuit 24. As shown in the upper part of FIG. 2, the pulse signal P1s from pulse output circuit 25 changes from low to high at the timing of each trigger signal Trg2 and changes from high to low at the timing of each trigger signal Trg4.

Timer circuit 24 outputs each trigger signal Trg2 in such a manner that the period from a trigger signal Trg2 to the next trigger signal Trg2 increases at each cyclic period Tt. As a result, as described above, pulse output circuit 25 outputs the pulse signal P1s shown in the upper part of FIG. 2 in such a manner that the cyclic period Tt increases in the order of the periodic time widths Tt1 to Ttn.

To achieve the predetermined duty ratio, timer circuit 24 outputs each trigger signal Trg4 in such a manner that the period Th from the trigger signal Trg2 to the trigger signal Trg4 in the same cyclic period Tt increases at each cyclic period Tt. As a result, as described above, the pulse signal P1s supplied from pulse output circuit 25 has the constant and equal duty ratio in each cyclic period.

In the present exemplary embodiment, in order to diagnose faults in AD converter circuits 22 and current detection circuits 15, the above-described pulse signal P1s is applied to RC filter 26. The application of the pulse signal P1s causes capacitor 28 to repeat charge and discharge, so that the capacitor voltage Vc has the waveform shown in the lower part of FIG. 2. More specifically, when the waveform of the pulse signal P1s from pulse output circuit 25 has the predetermined duty ratio and is in the predetermined frequency range, the capacitor voltage Vc at the intermediate connection point P in RC filter 26 has a saw-tooth wave with a predetermined peak voltage.

The output interval between the trigger signals Trg1 and Trg3 from timer circuit 24 is gradually increased to increase the interval between the timings C1 and C2 at which AD converter circuits 22 read the capacitor voltage. As a result, the pulse signal P1s to be applied to RC filter 26 has the fixed duty ratio and the decreasing frequency per pulse.

A more specific example of this processing will now be described as follows. This example has the following conditions. Timer circuit 24 includes a counter for counting the clock pulse Clk and generates the trigger signals Trg1 to Trg4 using the counter. The predetermined duty ratio is 20%, and the cyclic period Tt of the pulse signal P1s continues to double in length each cyclic period and to decrease in frequency.

Timer circuit 24 can operate as follows using the counter. First, in the first measurement period M1, timer circuit 24 causes the counter to start counting up from "0" at the timing of the trigger signal Trg2. When the count reaches "99", timer circuit 24 outputs the trigger signal Trg4. When the count is incremented to reach "499", timer circuit 24 outputs the next trigger signal Trg2 and ends the first measurement period M1. As a result, in the pulse signal P1s from pulse output circuit 25 in the first measurement period M1, the periodic time width Tt1 is 500 times one clock cycle and the time width Th1 of the high period Th is 100 times one clock cycle. Assuming, for example, that one clock cycle is 0.1 µS (10 MHz in terms of frequency), the periodic time width Tt1 is 50 µS (corresponding to 500 clocks), the high period width Th1 is 10 µS (corresponding to 100 clocks), and the duty ratio is 10 µS/50 µS=20%.

The timings of the trigger signals Trg1 and Trg3 as the sampling timings of AD converter circuits 22 in the first measurement period M1 are determined as follows. The trigger signal Trg4 is output immediately after the trigger signal Trg3 as described above. In other words, the trigger signal Trg3 is output immediately before the trigger signal Trg4 corresponding to the count "99", or as soon as the count reaches "98". The trigger signal Trg2 is output immediately after the trigger signal Trg1. In other words, the trigger signal Trg1 is output immediately before the trigger signal Trg2 corresponding to the count "499" or as soon as the count reaches "498".

Next, the cyclic period Tt in the second measurement period M2 can be doubled compared with that in the measurement period M1 as follows. First, the counter is reset and made to restart counting up from "0". When the count reaches "199", timer circuit 24 outputs the trigger signal Trg4. When the count is incremented to reach "999", timer circuit 24 outputs the next trigger signal Trg2 and ends the measurement period M2. As a result, in the pulse signal P1s from pulse output circuit 25 in the first measurement period M1, the periodic time width Tt2 corresponds to 1000 clocks, and the time width Th2 of the high period Th corresponds to 200 clocks. The duty ratio is 20%, which is the same as in the measurement period M1. For the same reason as in the measurement period M1, the trigger signal Trg3 is output when the count reaches "198", and the trigger signal Trg1 is output when the count reaches "998".

In the present exemplary embodiment, the above-described processing is performed in each measurement period to apply the pulse signal P1s, which has the fixed duty ratio and the gradually decreasing frequency, to RC filter 26. The charging time of capacitor 28 increases per pulse, and the peak voltage of the capacitor voltage Vc increases in the order of V1, V2, and V3. When the pulse signal P1s to be applied to RC filter 26 falls below the predetermined frequency, the peak voltage reaches saturation at Vcmax. AD converter circuits 22 read the capacitor voltage Vc at its lowest value at each timing C1. At the timing C2 in each measurement period, circuits 22 read the capacitor voltage Vc which is at its highest value and whose peak voltage increases in the order of V1, V2, and V3.

The following is a detailed description of the processing performed by units 19, 20, and 21.

First, the processing performed by AD-converter-circuit diagnosis unit 19 will now be described as follows. Unit 19 diagnoses faults in AD converter circuits 22 using the digital signals Dig1 to Dig3 from circuits 22 at each timing C1. The signals Dig1 to Dig3 are hereinafter collectively referred to as output values Dig.

AD converter circuits 22 receive analog signals ranging from a lower limit voltage Vmin to an upper limit voltage Vmax. Circuits 22 then output digital output values Dig ranging from a lower-limit output value corresponding to the lower limit voltage Vmin to an upper-limit output value corresponding to the upper limit voltage Vmax. For example, general 8-bit linear AD converter circuits 22 are configured to output the following: an output value Dig of "0" when receiving a lower limit voltage Vmin of 0 V; an output value Dig of "255" when receiving an upper limit voltage Vmax of 1 V; and an output value Dig of "128" when receiving an intermediate voltage of 0.5 V. The following description is on the assumption that the lower limit voltage Vmin and the upper limit voltage Vmax to be applied to the channels ch2 of circuits 22 are a minimum value Vcmin and a maximum value Vcmax, respectively, of the capacitor voltage Vc.

AD-converter-circuit diagnosis unit 19 diagnoses whether AD converter circuits 22 are properly converting the received lower limit voltage Vmin into the output values Dig. The lower limit voltage Vmin used in the present exemplary embodiment is the minimum value Vcmin, which is the capacitor voltage Vc at its lowest value when capacitor 28 is fully discharged at a timing C1. In this configuration, if any of the output values Dig falls outside the predetermined normal range of the lower limit voltage Vmin, AD-converter-circuit diagnosis unit 19 diagnoses the corresponding circuit 22 as faulty. Unit 19 then sends the error stop signal Err to rotation control unit 12 to stop the rotation of motor 40.

For example, when the predetermined normal range of the lower limit voltage Vmin is from "0" to "5", AD-converter-circuit diagnosis unit 19 diagnoses the corresponding circuit 22 as faulty when the output value Dig is "7" and as not faulty when the output value is "4".

The processing performed by AD-conversion-error calculation unit 20 will be described as follows. Unit 20 calculates the error between the reference value used in AD conversion and the output value Dig of each circuit 22 at the timing C2, and then determines, using the error, whether each circuit 22 is operating properly. In short, unit 20 determines, based on the calculated error, whether each circuit 22 is properly converting the received input voltage Vin into the output value Dig.

The operation of AD-conversion-error calculation unit 20 will be briefly described as follows. Assume that 8-bit linear AD converter circuits 22 are configured to convert an input voltage of 0 to 1 V into an output value Dig of "0" to "255", and to convert an input voltage of 0.5 V into an output value Dig of "128", which is a standard intermediate value. Also assume that circuits 22 actually converted an input voltage of 0.5 V into an output value Dig of "127" due to variations in their accuracy. In the present exemplary embodiment, the difference in the output value Dig between the standard value and the measured value is referred to as the conversion error. In the above case, the standard value "128" and the measured value "127" have a difference "1" as the conversion error, which AD-conversion-error calculation unit 20 calculates. If the conversion error is large, unit 20 determines that circuits 22 are faulty.

In the present exemplary embodiment, what is used as the input voltage Vin is the capacitor voltage Vc obtained at each timing C2 by charging capacitor 28 for a predetermined time More specifically, as shown in the lower part of FIG. 2, the peak voltage of capacitor voltage Vc changes in the order of V1, V2, and V3 in each measurement period. Unit 20 determines whether the conversion functions of circuits 22 are faulty based on each output value Dig in response to each changing input voltage Vin. More specifically, if any of the output values Dig falls outside the predetermined normal range of the corresponding voltage Vin, AD-conversion-error calculation unit 20 determines that the corresponding AD converter circuit 22 is faulty. Determining that the corresponding circuit 22 is faulty, unit 20 sends the error stop signal Err to rotation control unit 12 to stop the rotation of motor 40.

The following is a detailed description of how AD-conversion-error calculation unit 20 calculates the conversion error in AD conversion. Unit 20 calculates the conversion error based on the difference between the actual output value Dig and a theoretical value Ac in response to the input voltage Vin in each AD converter circuit 22. In the present exemplary embodiment, unit 20 further determines whether the calculated conversion error falls outside the predetermined normal range. In the following description, the conversion error is referred to as an offset Ados. In the case of the above-described 8-bit linear AD converter circuits 22, the theoretical value Ac in response to an input voltage Vin of 0.5 V is "128", the actual output value Dig is "127", and the offset Ados is "1".

In the present exemplary embodiment, in order to determine the offset Ados in each AD converter circuit 22, the conversion error is calculated based on the difference between the actual output value Dig produced in response to the capacitor voltage Vc and the AD-converted value calculated from the charging time of capacitor 28. More specifically, the input voltage Vin corresponding to an input of the capacitor voltage Vc in each measurement period is calculated using the time width of a high period Th of the pulse signal P1s. The high period Th is calculated from the cyclic period of the clock pulse Clk and the clock count number. Thus, AD-conversion-error calculation unit 20 calculates the conversion error based on the difference between the above-mentioned actual output value Dig and the calculated AD-converted value when the predetermined cycle number of the clock pulse Clk has passed.

Clock generation circuit 23 used in the present exemplary embodiment is not a crystal oscillator with high frequency accuracy, but an inexpensive RC oscillator with low frequency accuracy. In order to ensure the high periods Th, the clock error rate Ce is used to correct variations in the cyclic period of the clock pulse Clk.

First, a charging time Tc between each timing C1 and each timing C2 is calculated from the clock error rate Ce and the set value of the pulse width using Mathematical Formula (1) below. Since capacitor 28 is charged in a high period Th of the pulse signal P1s, the charging time Tc is equal to the high period Th.

[Math. 1]

$$Tc = Cy \times Bt \times Ce \quad (1)$$

in which Cy is a reference clock cycle number in a high period Th of the pulse signal P1s to be applied to RC filter 26. For example, Cy is a count number when the counter of timer circuit 24 counts the clock pulse Clk from the trigger signal Trg2 to the trigger signal Trg4 in the same cyclic period Tt. Bt is the cyclic period of the clock pulse Clk. Ce is the clock error rate Ce, which is the ratio of an actual cyclic period Bt' to the designed cyclic period Bt in the cyclic period of the clock pulse Clk.

Assume, for example, that the designed cyclic period Bt of the clock pulse Clk generated by clock generation circuit 23 is 0.1 μS, but the cyclic period Bt' of the actual clock pulse Clk is 0.101 μS due to variations in circuit accuracy. In this case, the clock error rate Ce amounts to Bt'/Bt=0.101/0.1. Also assume that in order to generate a high period Th of the pulse signal P1s, the counter counts the clock pulse Clk to "100". In this case, the reference clock cycle number Cy is "100", and as a result, the charging time Tc amounts to Cy×Bt×Ce=100×0.1 μS×(0.101/0.1)=10.1 μS.

The clock error rate Ce may be stored in memory 31. In this case, the actual cycle of clock generation circuit 23 is measured during the fabrication process of brushless motor drive device 10, and the difference between the correct and actual cycles is stored as the clock error rate Ce.

Alternatively, in the case that serial communication is used to receive commands such as the rotation speed/torque command Tsp from an external host controller, the clock error rate Ce can be calculated as follows. First, make sure that the pulse cycle used for the serial communication is provided with high accuracy. Next, a comparison is made between the pulse frequency of the command signal received from the host controller and the frequency of the reference clock received from clock generation circuit 23. More specifically, the clock error rate Ce represents the ratio of the theoretical cycle number to the actual cycle number of the reference clock in one cycle of the pulse of the command signal. The command signal received from the host unit can be the rotation speed/torque command Tsp or a signal periodically received.

Figure 3:
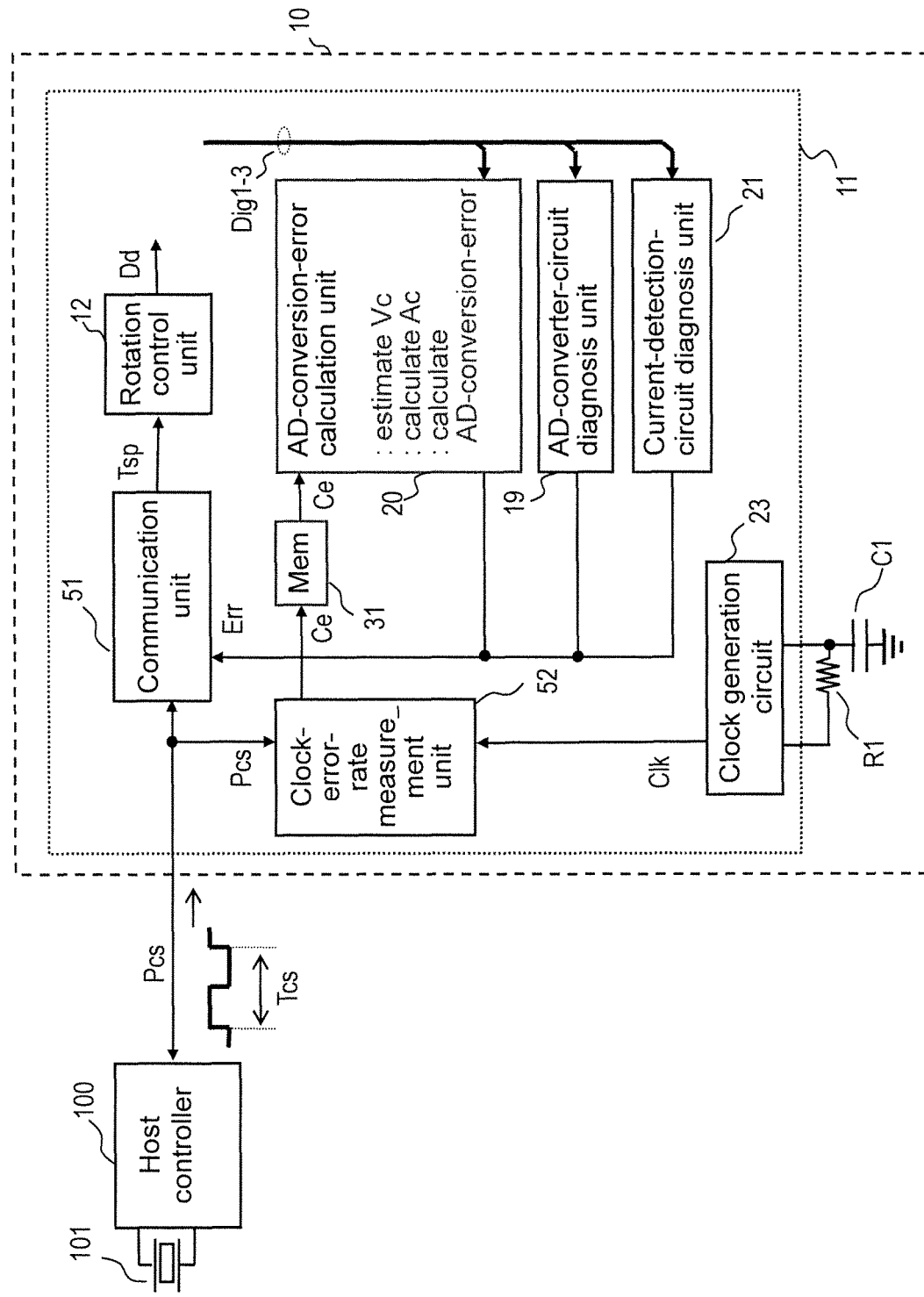
FIG. 3 is a block diagram of a configuration to calculate a clock error rate Ce in the brushless motor drive device in accordance with the first exemplary embodiment.

FIG. 3 is a block diagram of a configuration to calculate the clock error rate Ce using a signal received from a host controller. FIG. 3 only shows the main parts to calculate the clock error rate Ce in the case in which brushless motor drive device 10 and host controller 100 have a communication function to transmit and receive command signals and other data. In the example of FIG. 3, host controller 100 operates with a clock signal generated by crystal oscillator 101 with high frequency accuracy, meanwhile control unit 11 causes clock generation circuit 23 to generate the clock pulse Clk and operates with it. Circuit 23 is an RC oscillator with low frequency accuracy and includes resistor R1 and capacitor C1.

Control unit 11 includes communication unit 51 and clock-error-rate measurement unit 52. Unit 51 performs communication with host controller 100. Unit 52 measures the clock error rate Ce using a communicating pulse signal Pcs, such as a command signal received from host controller 100 via communication unit 51. Clock-error-rate measurement unit 52 calculates the clock error rate Ce from a one-cycle period Tcs of the communication pulse signal Pcs and the cyclic period of the clock pulse Clk received from clock generation circuit 23. In short, unit 52 measures a count number Ncp of the clock pulse Clk in the period Tcs. Assume that host controller 100 has a clock count number Ncs in the one-cycle period Tcs of the communication pulse signal Pcs. In this case, the theoretical cycle number of the reference clock in the period Tcs is equal to Ncs because host controller 100 has high frequency accuracy. As a result, clock-error-rate measurement unit 52 calculates, as the clock error rate Ce, a ratio (Ncs/Ncp) of the theoretical cycle number Ncs to an actual cycle number Ncp of the reference clock in one cycle of the communication pulse signal Pcs.

Next, an AD terminal voltage (theoretical value) Vca to be applied to each AD converter circuit 22 is calculated from the charging time Tc of capacitor 28 and the formula of the capacitor voltage of the pulse waveform of RC filter 26 using Mathematical Formula (2).

[Math. 2]

$$Vca = V\max \times \left(1 - \exp\left(-\frac{Tc}{R \times C}\right)\right) \quad (2)$$

in which R is the resistance of resistor 27, and C is the capacitance of capacitor 28 in RC filter 26.

Next, an AD-converted value (theoretical value) Ac in the case that AD converter circuits 22 have no conversion error from the AD terminal voltage Vca is calculated using Mathematical Formula (3).

[Math. 3]

$$Ac = \frac{Ac\max}{Vc\max} \times Vca \quad (3)$$

in which Acmax and Vcmax are a maximum output value and a maximum input value, respectively, of AD converter circuits 22.

Next, the difference is calculated between the AD-converted value (theoretical value) Ac and an AD-converted value (actual measurement) Dig output from each AD converter circuit 22 using Mathematical Formula (4). The calculated difference is referred to as the offset Ados.

[Math. 4]

$$Ados = Ac - Dig \quad (4)$$

If the calculated offset Ados falls outside the predetermined normal range, AD-conversion-error calculation unit 20 determines that the corresponding circuit 22 is faulty. For example, assume that the predetermined normal range of the offset Ados is −5 to +5, the AD-converted value (theoretical value) Ac is "17", and the AD-converted value (actual measurement) Dig is "10". In this case, the offset Ados is "7", which falls outside the predetermined normal range, so that the circuit 22 is determined to be faulty. Meanwhile, assume that the AD-converted value (theoretical value) Ac is "17" and the AD-converted value (actual measurement) Dig is "13". In this case, the offset Ados is "4", which falls within the predetermined normal range, and is not determined to be faulty.

The processing performed by current-detection-circuit diagnosis unit 21 will not be described as follows. Unit 21 diagnoses whether current detection circuits 15 are faulty while motor 40 is in the stopped state, using the output values Dig of AD converter circuits 22 which have read the outputs of current detection circuits 15. In short, if any of the output values Dig falls outside the predetermined normal range, the corresponding circuit 15 is determined to be faulty. More specifically, the current values detected while motor 40 is in the stopped state should be zero, and therefore, the normal range is set from "0 to 9". In this case, if the output value Dig of any of circuits 22 is "10", the corresponding current detection circuit is determined to be faulty.

The above-described processing is performed per pulse applied to RC filter 26. As described above, the pulse signal P1s decreases in frequency per pulse, so that the charging time of capacitor 28 increases per pulse. This allows determining whether circuits 22 are faulty based on the whole range of the output values Dig from the minimum to the maximum.

In the above-described configuration, control unit 11 includes functional blocks including digital circuits, but may alternatively be achieved by implementing programs. One such example is as follows. The functions of units 18, 17, 12, and 13 are incorporated into a program to provide a method of controlling the rotation, and the functions of units 19, 20, and 21 are incorporated into another program to provide a method of performing diagnosis. These programs are stored in memory. The memory may also store the method of calculating the conversion error of AD-conversion-error calculation unit 20 and the method of generating correction values for the AD converter circuits based on the conversion error. These programs may be implemented on a microcomputer. As another example, control unit 11 including circuits 22 and circuit 23 for generating the reference clock of the microcomputer may be implemented as one-chip large-scale integration (LSI) together with the functions of the microcomputer.

As an example of implementing programs, it is possible to calculate the conversion error of the AD converter circuits as follows using a microcomputer. First, the pulse signal P1$s$ with a changing frequency is generated based on the clock pulse Clk and applied to RC filter 26. Next, the conversion error is calculated based on the difference between the output value of each AD converter circuit 22 produced in response to an input of the voltage of capacitor 28 and the AD-converted value calculated from the charging time of capacitor 28. Furthermore, the conversion error can be used to generate correction values for the AD converter circuits using a microcomputer.

Second Exemplary Embodiment

Figure 4:
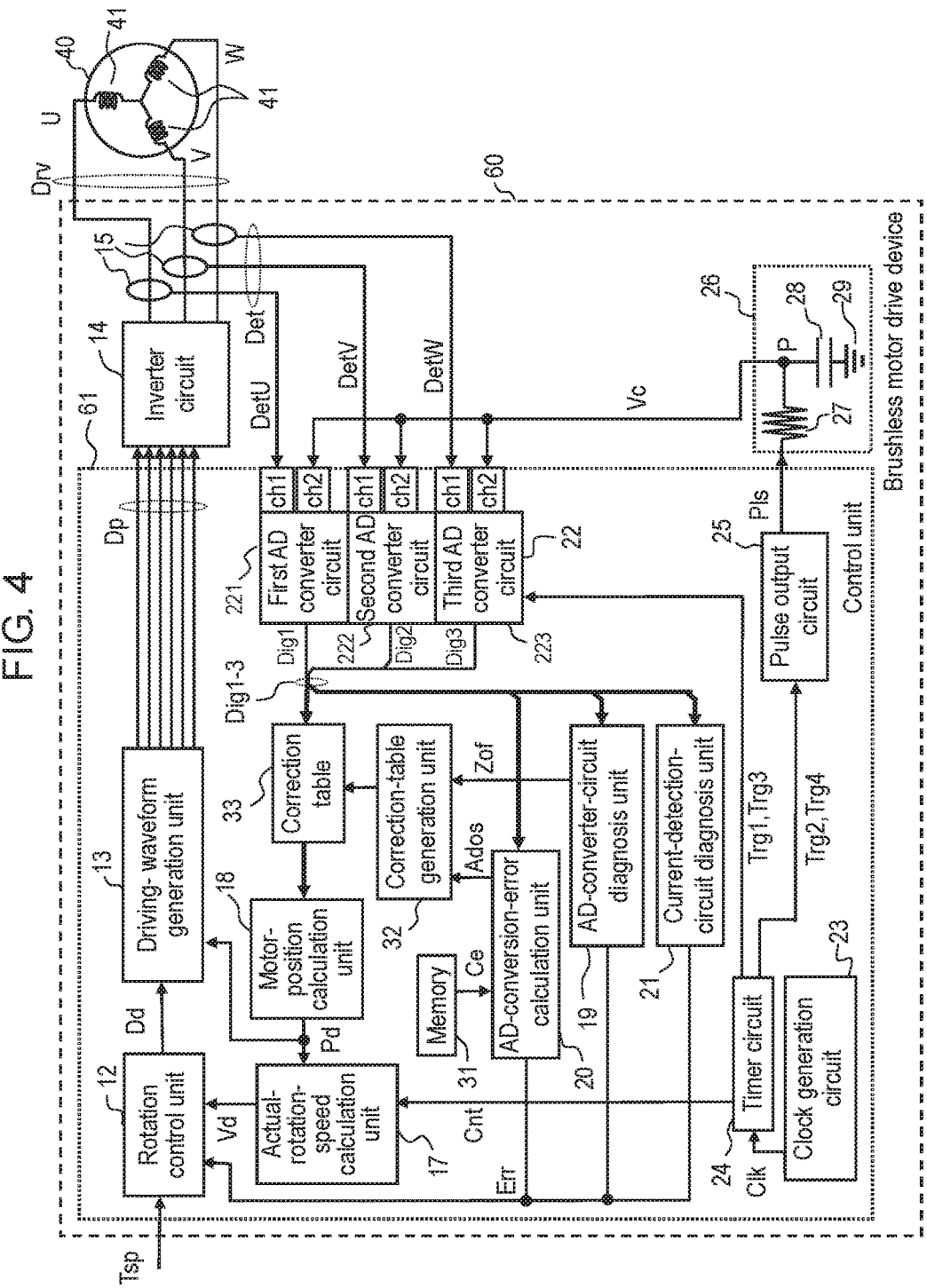
FIG. 4 is a block diagram showing a configuration of a brushless motor drive device in accordance with a second exemplary embodiment of the present invention.

FIG. 4 is a block diagram showing the configuration of brushless motor drive device 60 in accordance with a second exemplary embodiment of the present invention. In the example of FIG. 4, device 60 is connected to motor 40. In the same manner as in the first exemplary embodiment, device 60 drives motor 40 to control its rotation in accordance with an external command.

In the present exemplary embodiment, control unit 61 includes correction-table generation unit 32 and correction table 33, which are not included in control unit 11 in accordance with the first exemplary embodiment. The other components are identical to those contained in the first exemplary embodiment, and hence, they are not described in detail again.

As described in the first exemplary embodiment, AD-conversion-error calculation unit 20 calculates the offsets Ados, which are the conversion errors from the reference value in AD conversion, using the output values Dig produced in response to the input voltages Vin of AD converter circuits 22. In the present exemplary embodiment, these offsets Ados are used to correct the digital signals Dig1 to Dig3, which are the output values Dig.

To perform such corrections, in the present exemplary embodiment, correction table 33 is disposed at the input of motor-position calculation unit 18. More specifically, correction table 33 corrects the digital signals Dig1 to Dig3 from AD converter circuits 22 by using correction values stored in the table, and sends the corrected signals to motor-position calculation unit 18. Correction-table generation unit 32 generates correction table 33 by storing the offsets Ados, which are calculated sequentially by unit 20, into correction table 33.

More specifically, first, if the output value Dig in response to the minimum value Vcmin of the capacitor voltage Vc falls within the predetermined normal range, AD-converter-circuit diagnosis unit 19 supplies the output value Dig in the form of a zero offset Z of to correction-table generation unit 32. Unit 32 stores the zero offset Z of which is correction data, into correction table 33. For example, in the case that the lower limit voltage Vmin has a predetermined normal range of "0" to "5", if the output value Dig is "7", AD-converter-circuit diagnosis unit 19 diagnoses the corresponding AD converter circuit 22 as faulty. If the output value is "4", unit 19 diagnoses the circuit 22 as not faulty, and correction-table generation unit 32 stores the zero offset Z of as "4" into correction table 33.

Next, if the calculated offset Ados falls within the predetermined normal range, AD-conversion-error calculation unit 20 sends the offset Ados to correction-table generation unit 32. Unit 32 stores both the output value Dig and the corresponding offset Ados into correction table 33. Assume, for example, that the offset Ados has a predetermined normal range of from −5 to +5. In this case, if the AD-converted value (theoretical value) Ac is "17", and the AD-converted value (actual measurement) Dig is "13", the offset Ados is "4". Since it falls within the predetermined normal range, correction-table generation unit 32 stores the offset Ados of "4", which corresponds to the output value Dig of "13", into correction table 33.

Figure 5:
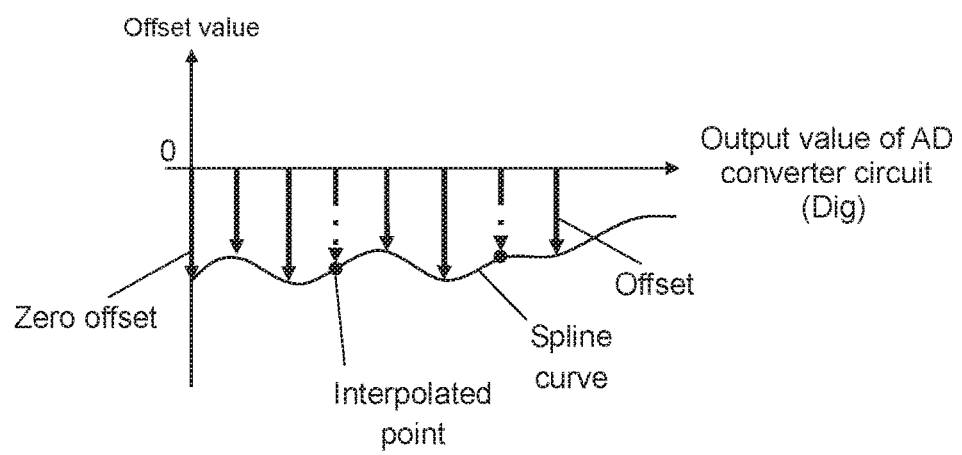
FIG. 5 is a diagram showing interpolation of a correction table in the brushless motor drive device in accordance with the second exemplary embodiment.

Correction table 33, which is generated individually for each of first to third AD converter circuits 22, stores the offsets Ados corresponding to the output values Dig in the entire normal range. If the offsets Ados corresponding to some of the output values Dig are not stored, it is possible to interpolate them by using a spline curve as shown in FIG. 5.

As shown in FIG. 4, the above-generated correction table 33 is disposed at the output of AD converter circuits 22 and is used to correct the voltages detected by current detection circuits 15. For example, the AD-converted values (actual measurement) from current detection circuits 15 can be corrected by an amount corresponding to the offset so that motor-position calculation unit 18 can calculate an accurate rotor position. As a result, actual-rotation-speed calculation unit 17 can calculate an accurate actual rotation speed, so that rotation control unit 12 can perform accurate speed and torque controls.

In the first and second exemplary embodiments, control unit 11 includes functional blocks including digital circuits, but may alternatively be achieved by implementing programs. One such example is as follows. The functions of units 18, 17, 12, and 13 are incorporated into a program to provide a method of controlling the rotation, and the functions of units 19, 20, and 21 are incorporated into another program to provide a method of performing diagnosis. These programs are stored in memory. The memory may also store the method of calculating the conversion error of AD-conversion-error calculation unit 20 and the method of generating correction values for the AD converter circuits based on the conversion error. These programs may be implemented on a microcomputer. As another example, control unit 11 including circuits 22 and circuit 23 for generating the reference clock of the microcomputer may be implemented as one-chip large-scale integration (LSI) together with the functions of the microcomputer.

As an example of implementing programs, it is possible to calculate the conversion error of the AD converter circuits as follows using a microcomputer. First, the pulse signal P1s with a changing frequency is generated based on the clock pulse Clk and applied to RC filter 26. Next, the conversion error is calculated based on the difference between the output value of each AD converter circuit 22 produced in response to an input of the voltage of capacitor 28 and the AD-converted value calculated from the charging time of capacitor 28. Furthermore, the conversion error can be used to generate correction values for the AD converter circuits using a microcomputer.

These highly accurate calculations are available not only for the outputs of current detection circuits 15 but also for all sensor-detection values entered to AD converter circuits 22, such as values detected by a temperature sensor and a hydraulic sensor. This reduces variations in the detection of abnormally high temperature and pressure by these sensors to provide protective features.

The pulse frequency applied to RC filter 26 increases per pulse, so that the frequency of the electromagnetic noise from the motor control circuits disperses and decreases its peak value. This reduces the number of electromagnetic compatibility (EMC)-protection components.

It is not necessary to provide a circuit for complicated diagnosis to each of the large number of AD converter circuits. Therefore, the motor drive device can be achieved only by a small microcomputer with a small number of pins and inexpensive circuitry, and hence requires less circuit cost.

As described above, the brushless motor drive device in accordance with the present invention does not require a large motor or a large circuit board to ensure enough margin for the rotation error and the torque error, so that the cooling fan can be smaller and lighter in weight.

INDUSTRIAL APPLICABILITY

The brushless motor drive method and brushless motor drive device in accordance with the present invention performs accurate speed and torque controls by a simple structure, and is particularly suitable for cooling fans and blowers intended to have high efficiency and low noise.

REFERENCE MARKS IN THE DRAWINGS

10, 60 brushless motor drive device
11, 61 control unit
12 rotation control unit
13 driving-waveform generation unit
14 inverter circuit
15 current detection circuit
17 actual-rotation-speed calculation unit
18 motor-position calculation unit
19 AD-converter-circuit diagnosis unit
20 AD-conversion-error calculation unit
21 current-detection-circuit diagnosis unit
22, 221, 222, 223 AD converter circuit
23 clock generation circuit
24 timer circuit
25 pulse output circuit
26 RC filter
27 resistor
28 capacitor
29 ground
31 memory
32 correction-table generation unit
33 correction table
40 brushless motor
41 coil
51 communication unit
52 clock-error-rate measurement unit
100 host controller

The invention claimed is:

1. A brushless motor drive device for driving a brushless motor, the brushless motor drive device comprising:
   an inverter circuit configured to energize and drive a winding of the brushless motor;
   a current detection circuit configured to detect a current value of the winding;
   a control unit configured to control rotation of the brushless motor; and
   a resistor-capacitor (RC) filter including a resistor and a capacitor and configured such that the capacitor performs charge and discharge operations in accordance with an applied signal,
   wherein the control unit includes:
      a drive control unit configured to generate a signal to drive the inverter;
      a clock generation circuit configured to generate a clock pulse to be used as a reference for an operation period;
      a pulse output circuit configured to generate a pulse signal with a changing frequency based on the clock pulse generated by the clock generation circuit and to apply the pulse signal to the RC filter;
      an analog-digital (AD) converter circuit connected to the capacitor of the RC filter and the current detection circuit, the AD convertor circuit being configured to receive analog voltages from the capacitor and the current detection circuit and convert the received analog voltages into output values indicated by digital values; and
      an AD-conversion-error calculation unit configured to calculate a conversion error of the AD converter circuit, wherein:
      the AD converter circuit receives a capacitor voltage of the capacitor, converts the received capacitor voltage into an actual measured value indicated by a digital value in response to the received capacitor voltage and outputs the actual measured value, the capacitor voltage being the voltage of the capacitor when the capacitor is charged for a predetermined time as a charging time corresponding to the pulse signal applied to the RC filter, and
      the AD-conversion-error calculation unit estimates the capacitor voltage based on the charging time and a formula of the capacitor voltage of the RC filter, calculates a theoretical value of the AD converter circuit for the estimated capacitor voltage based on a conversion specification of the AD converter circuit, and calculates the conversion error based on a difference between the actual measured value in response to the received capacitor voltage and the theoretical value for the estimated capacitor voltage.

2. The brushless motor drive device according to claim 1, wherein
   the pulse output circuit sends to the RC filter the pulse signal the frequency of which changes per pulse; and
   the AD-conversion-error calculation unit calculates the conversion error based on the difference obtained when a predetermined cycle number of the clock pulse passes.

3. The brushless motor drive device according to claim 2, wherein
the pulse signal to be sent from the pulse output circuit to the RC filter has a high-level period equal to a pulse width in which the clock pulse is counted up to a count number whose value changes per pulse, and
the AD-conversion-error calculation unit calculates, from the high-level period of the pulse signal, the charging time during which the capacitor is charged.

4. The brushless motor drive device according to claim 3, wherein the AD-conversion-error calculation unit calculates a clock error rate from a cyclic period of a communication pulse signal received as a command from outside and a cyclic period of the clock pulse, and then calculates the charging time by correcting the charging time using the clock error rate.

5. The brushless motor drive device according to claim 1, further comprising:
a correction table configured to correct the output value of the AD converter circuit; and
a correction-table generation unit configured to generate the correction table, the correction-table generation unit generating the correction table using, as a correction value, the conversion error calculated by the AD-conversion-error calculation unit.

6. The brushless motor drive device according to claim 1, further comprising an AD-converter-circuit diagnosis unit configured to diagnose faults in the AD converter circuit, the AD-converter-circuit diagnosis unit diagnosing the AD converter circuit as faulty when the pulse signal to be applied to the RC filter is low and the output value of the AD converter circuit produced in response to an input of a capacitor voltage of the RC filter falls outside a predetermined range.

7. The brushless motor drive device according to claim 1, wherein the AD-conversion-error calculation unit determines that the AD converter circuit is faulty when the pulse signal to be applied to the RC filter is high and the conversion error calculated falls outside a predetermined range.

8. The brushless motor drive device according to claim 1, further comprising a current-detection-circuit diagnosis unit configured to diagnose faults in the current detection circuit, the current-detection-circuit diagnosis unit diagnosing the current detection circuit as faulty when the brushless motor is in a stopped state and the output value of the AD converter circuit produced in response to an input of an output value of the current detection circuit falls outside a predetermined range.

9. The brushless motor drive device according to claim 1, wherein:
the current detection circuit includes a first current detector configured to detect a first current value of a U-phase wire of the winding, a second current detector configured to detect a second current value of a V-phase wire of the winding and a third current detector configured to detect a third current value of a W-phase wire of the winding, and
the AD convertor circuit includes a first AD convertor that receives the capacitor voltage and the first current value, a second AD convertor that receives the capacitor voltage and the second current value and a third AD convertor that receives the capacitor voltage and the third current value.

10. The brushless motor drive device according to claim 1, wherein the theoretical value of the AD converter circuit Vca is calculated by using the following formula:

$$Vca = V\max \times \left(1 - \exp\left(-\frac{Tc}{R \times C}\right)\right)$$

where R is a resistance of the resistor 27, C is a capacitance of the capacitor in the RC filter, Tc is the charging time, and Vmax is an upper limit voltage of an analog voltage that the AV convertor circuit receives.

* * * * *